United States Patent [19]

Mazowiesky

[11] Patent Number: 6,104,036

[45] Date of Patent: Aug. 15, 2000

[54] APPARATUS AND METHOD FOR DETECTING A SECURITY FEATURE IN A CURRENCY NOTE

[75] Inventor: Thomas W. Mazowiesky, Hauppauge, N.Y.

[73] Assignee: Global Payment Technologies, Hauppauge, N.Y.

[21] Appl. No.: 09/022,529

[22] Filed: Feb. 12, 1998

[51] Int. Cl.[7] .................................................. G06K 5/00
[52] U.S. Cl. ............................................ 250/556; 356/71
[58] Field of Search ............................. 250/556, 559.44, 250/339.11, 338.1; 356/71

[56] References Cited

U.S. PATENT DOCUMENTS

| | | | |
|---|---|---|---|
| 4,296,326 | 10/1981 | Haslop et al. ........................... | 250/372 |
| 4,524,276 | 6/1985 | Ohtombe ................................. | 250/338 |
| 4,980,569 | 12/1990 | Crane et al. ............................ | 250/556 |
| 5,260,582 | 11/1993 | Danek et al. ........................... | 250/556 |
| 5,468,971 | 11/1995 | Ebstein et al. .......................... | 250/556 |
| 5,630,755 | 5/1997 | Walsh et al. ............................ | 463/25 |

*Primary Examiner*—Que T. Le
*Attorney, Agent, or Firm*—Finnegan, Henderson, Farabow, Garrett & Dunner

[57] ABSTRACT

An apparatus and method for detecting watermark and security thread in a currency note. Optical sensing circuits positioned from the surface of the currency note rely upon the transmissive and reflective characteristics of the security features and the note itself to determine the authenticity of the note and the security feature. The apparatus and methods determine a difference signal between the transmissive and reflective light signals and compare the difference signal to a series of known difference signals.

51 Claims, 8 Drawing Sheets

APPARATUS AND METHOD FOR DETECTING A SECURITY FEATURE IN A CURRENCY NOTE

BACKGROUND OF THE INVENTION

Generally, the present invention relates to the field of bill and currency note validation, and in particular to detecting and determining the authenticity of watermarks and security threads contained in currency notes.

In general, it is fairly easy to create a color copy of any currency using commonly available color printers. These printers are easily accessible and available worldwide at low cost and combining them with a color scanner and personal computer (PC), potentially permits a counterfeit currency note or bill to be readily made in a few minutes, and replicated at high speed. In addition, the expanding availability of high quality color copiers eliminates the need for a PC and scanner to replicate a currency note.

In an effort to quash the introduction of counterfeit notes, many countries, including the United States, now feature either a watermark, a security thread or both in one or more denominations of currency. These security features are used to give the receivers a means to optically verify a particular note's authenticity. Both features are being incorporated in notes worldwide on an increasing basis as the capability of technology to produce high-quality counterfeit copies of notes increases.

In the early 1990's, the United States Treasury Department, for example, added a plastic security thread to most of the United States of America's denominations. This thread is embedded in the paper on which the money is printed, and includes a textual description of the denomination, e.g. $100 USA. Continued advancement of counterfeiting techniques have forced the Treasury Department to redesign many notes with such features as a more advanced security thread and a watermark.

Most security threads are fairly narrow (less than 0.100 inches wide) and generally run across the short dimension of the note. Threads are made of various materials, including plastics, metallized plastics and magnetic elements. These threads may be fully embedded in the notepaper, or may be 'weaved' with parts of the thread exposed above the paper surface. As in the United States, some threads are inscribed with the denomination of the note and often are located in various longitudinal positions in the note. To authenticate the note, an individual usually holds it in front of a light source to verify the existence of the thread and oftentimes read the denomination inscribed on the thread.

Currency paper watermarks are finely detailed images similar in resolution to the printing on the surface of the note. The images are produced through a combination of chemical treatment and/or pressure that causes variations in the distribution of fibers in the watermark area. These variations change the way light is absorbed and reflected causing a characteristic 'shadow' or dim image. In addition, the watermark may be partially or completely overlaid by printing on the surface of the note. For this reason, watermarks are often difficult to detect when observed head on, and therefore an individual typically illuminates the area from behind and looks for the image. Illuminating the note in this manner allows the required variations to be observed, thus allowing the individual to verify the authenticity of the note.

While the introduction of such security features are essential in deterring the passing of counterfeit currency notes and other documents, they are only as effective as the individual evaluating them. If, for example, an individual has neither the time or the inclination to verify the existence of these features their presence or absence in a particular currency document will not prevent a false note from being passed. This problem is most significant and apparent in businesses handling a large volume of paper money transfers. Environments such as casinos, currency exchanges, banks, etc., require a more automated and reliable way of preventing and detecting counterfeit currency introduction.

To accommodate these high volume environments, automatic verification devices such as bill note validators have been developed. For example, Haslop (U.S. Pat. No. 4,296,326) discloses an apparatus and method for detecting a genuine watermark, utilizing ultraviolet radiation. Haslop discloses measuring the fluorescence characteristics of a note by subjecting it to ultraviolet radiation. This device requires high powered light source to produce the ultraviolet radiation.

Ohtombe (U.S. Pat. No. 4,524,276) discloses an apparatus for optically detecting the presence of a metallic or non-metallic security thread in a bank note. The reference discloses an infrared emitter and multiple filtered detectors to test the transmissive characteristics of the embedded thread. Similarly, Crane (U.S. Pat. No. 4,980,569) discloses a device that measures the reflected and transmitted light from a note containing a thread. The device attempts to detect the counterfeiter's method of applying a thread on the surface of the paper by measuring the high reflectivity of a thread mounted in this manner.

Finally, Ebstein (U.S. Pat. No. 5,468,971), discloses an apparatus that detects the images of fine writing embedded within the security thread. In practical terms, this requires an intense light source and a high resolution set of sensors, as the resolution of the print is very high, on the order of 0.001" in width.

The prior art fails to provide a solution that detects and verifies the presence of a security thread and a watermark in one apparatus. Further, various features of the prior art such as high intensity light sources and high powered components make them incompatible with efficient and cost effective design constraints. For this reason, there is a need for a solution that can detect the presence of security features in a currency note, while still maintaining a low-cost and efficient component structure. In addition, the solution should provide a single design for determining the presence of both a watermarks and security threads.

SUMMARY OF THE INVENTION

Apparatus and methods consistent with the present invention detect and determine the authenticity of both watermarks and security threads, using optical systems of a transmissive and reflective nature. The physical characteristics of the watermark and security thread in the notes allows an apparatus and method consistent with the present invention to automatically verify the authenticity of the note or currency bill under test. In addition, an apparatus structure and design consistent with the present invention permits it to be implemented with small, low cost components, so it may be easily and economically reproduced in devices such as bank note validators.

More particularly, a method consistent with the present invention of detecting a security feature in a currency note comprises the steps of: illuminating an area of the currency note with a light source; receiving a reflected light signal at a first sensor; receiving a transmissive light signal at a second sensor; and comparing the reflected light signal with the transmissive light signal to detect the presence or absence of a security feature.

In another aspect, a method consistent with the present invention of detecting a security feature in a currency note comprises the steps of: illuminating a first area of the currency note with a first light source positioned on one side of the currency note; receiving, at a first sensor, a first reflected light signal positioned on the one side of the currency note; receiving, at a second sensor, a first transmissive light signal positioned on an opposite side of the currency note; illuminating a second area of the currency note with a second light source; receiving a second transmissive light signal at the first sensor, receiving a second reflective light signal at the second sensor, and comparing a total reflective signal with a total transmissive signal to produce a difference signal.

Further, provided is an apparatus for detecting a security feature in a currency note comprising: a light source for illuminating an area of the currency note; a first sensor, optically coupled to the light source, for receiving a reflected light signal; a second sensor, optically coupled to the light source, for receiving a transmissive light signal; and a processing circuit connected to the first and second sensors for comparing the reflected light signal with the transmissive light signal to detect the presence or absence of a security feature.

The summary and the following detailed description should not restrict the scope of the claimed invention. Both provide examples and explanations to enable others to broadly practice the invention. The accompanying drawings, which form part of the detailed description, show embodiments of the invention and, together with the description, explain the principles of the invention.

BRIEF DESCRIPTION OF THE DRAWINGS

The accompanying drawings, which are incorporated in and constitute a part of this specification, illustrate systems and methods consistent with this invention and, together with the description, explain the objects, advantages and principles of the invention.

In the drawings.

DETAILED DESCRIPTION

The following description of implementations of this invention refers to the accompanying drawings. Where appropriate, the same reference numbers in different drawings refer to the same or similar elements.

The embodied detector includes an identical apparatus for detecting both security features, though the apparatus is used in different ways. Those skilled in the art will recognize that the following detailed description serves only as an illustration of the features and functions of the present invention and do not limit the applications of this embodiment.

Apparatus and methods consistent with the present invention utilize the optical properties of the watermark and security thread. The watermark process, for example, produces an observable optical effect, and therefore when a watermark is viewed transmissively, between a light source and a detector, the normal image appears shaded, or positive. When light is reflected off the surface of the watermark at an angle, however, the image appears opposite to that of the positive image, or negative. Normally, this effect is easily observed by rotating the note. This effect is nearly impossible to counterfeit, because if an image is drawn or copied on the surface, it will either not transmit or reflect light properly or there will be no observable difference between the positive and negative images. Further, since watermarks are produced through a chemical or a pressure related process and comprise highly detailed images, they are difficult to accurately reproduce or mimic through the photocopying process. The photocopying process cannot produce the reflective and transmissive characteristics of a true watermark.

Security threads have similar effects on transmissive and reflected light. Light transmitted through the paper is partially or totally blocked by the thread, depending on the material. In previous inventions, the embedded nature of the thread is used for detection since the paper is the primary reflector of light. Most threads made of either plastic or metallized plastic material have a higher reflectivity than the surrounding paper. The apparatus and methods consistent with the present invention rely on this characteristic to detect the higher reflectivity of the thread.

Figure 1:
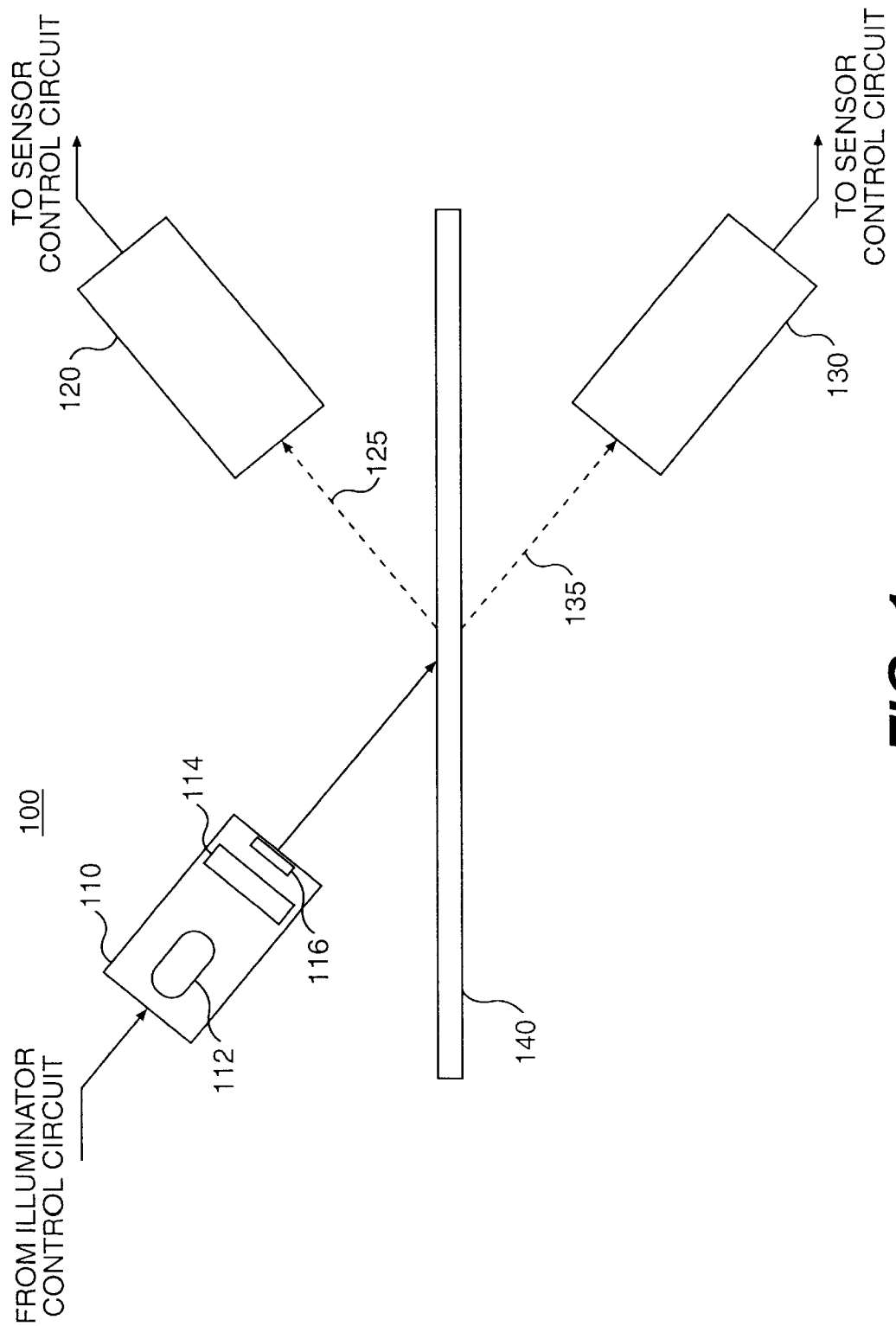
FIG. 1 is a block diagram of an apparatus for detecting a security feature in a currency note consistent with a first embodiment of the present invention.

FIG. 1 is a block diagram of an apparatus for detecting a security feature in a currency note consistent with a first embodiment of the present invention. Apparatus 100 includes an illuminator 110, a first sensor 120 and a second sensor 130. Preferably, illuminator 110 is angularly positioned from a first surface of a currency note 140 under test. First sensor 120 is also angularly positioned from the first surface of currency note 140. In the present embodiment, second sensor 130 is angularly positioned from a second surface of currency note 140. Preferably, currency note 140 is automatically positioned by a feeder device (not shown) between illuminator 110 and second sensor 130 such that a light signal from illuminator 110 passes through the first surface of currency note 140 and is received by second sensor 130. In this manner, both first sensor 120 and second sensor 130 are optically coupled to illuminator 110.

Illuminator 110 is a light source capable of producing a narrow width light beam that is projected onto the first surface of currency note 140. Preferably, illuminator 110 includes a laser diode as its light source 112, an aperture 114, and a focusing lens 116. The combination of light source 112, aperture 114 and focusing lens 116 produces a narrow strip of light that can be varied in size according to the resolution required to authenticate the security feature. A typical installation would use an aperture to produce a strip between 0.020" and 0.030" wide. In the alternative, light source 112 may include any light source capable of producing a narrow, high intensity light beam. For example, a standard light emitting diode (LED) with its emitting light focused on an area of currency note 140 would meet the requirements of the present invention.

Preferably, first sensor 120 and second sensor 130 have essentially the same structure and component elements. Both devices include a photo-detector, such as a photodiode, for receiving an optical signal. In the alternative, a phototransistor could be used in place of the photodiode. As stated, first sensor 120 is angularly positioned from a first surface of the currency note such that it receives a reflective light signal 125 produced by illuminator 110 and reflected from the first surface of currency note 140. Second sensor 130 is angularly positioned from a second surface of currency note 140, such that it receives a transmissive light signal 135 produced by illuminator 110 and passing through currency note 140. In the present embodiment, the sensors and illuminator are positioned at approximately a 45 degree angle with respect to the surfaces of currency note 140.

Figure 2A:
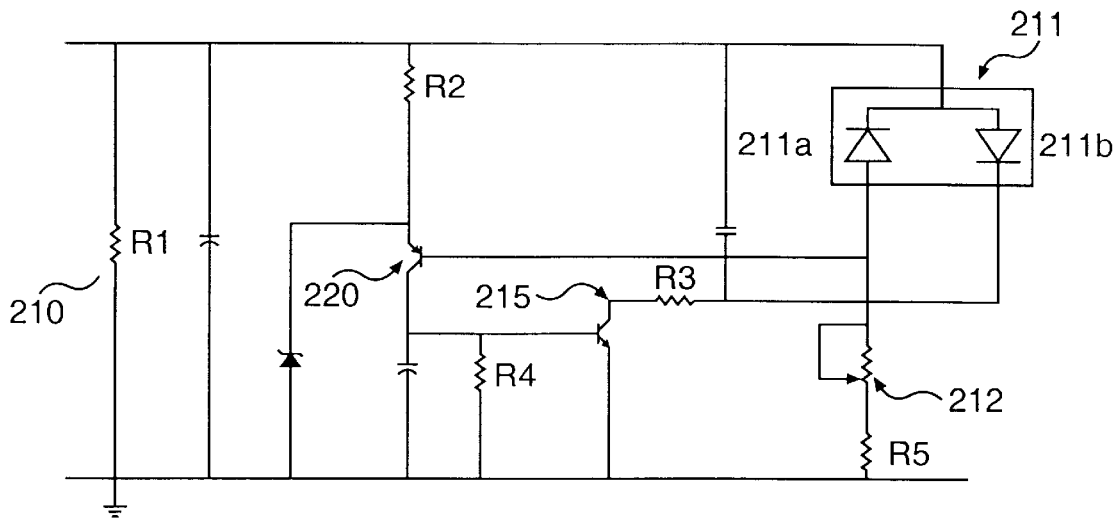
FIGS. 2A and 2B are a schematic representation of control circuits consistent with the present invention.

FIG. 2A is a schematic diagram showing an illuminator control circuit 210 using a laser diode as light source 112. In this example, laser diode 211 includes both an emitter 211a and an integral photodiode 211b to monitor the power output, and the desired output level is set with potentiometer 212. Current passing through the integral photodiode 211b is proportional to laser diode's 211 power output fed through transistor 220 via emitter 211a, which in turn drives transistor 215. Preferably, as the output of laser diode 211 goes higher than the set point an error signal reduces the current through laser diode 211, and when the current drops below the set point, the current through the laser diode 211 increases and the light signal emitted by laser diode 211 is increased. Potentiometer 212 provides the power output set point to control laser diode 211. In the alternative, however, potentiometer 212 could be replaced by a microprocessor controlled circuit. FIG. 2A shows that illuminator control circuit 210 includes a number of passive component elements R1–R5 and C1–C4 and zener diode D2 recognized by those skilled in the art to provide power supply protection and filtering for illuminator control circuit 210.

Figure 2B:
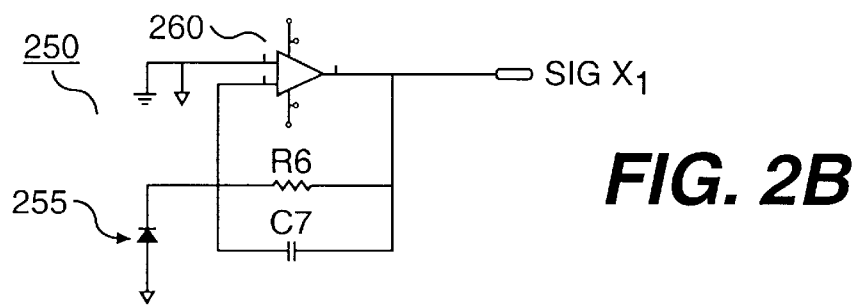

FIG. 2B is a schematic diagram showing an example of a photodetector circuit 250 consistent with the present invention. Photodetector circuit 250 includes photodiode 255 and op-amp 260, which together with filtering components R7 and C4 operates as a transimpedance amplifier. This transimpedance amplifier circuit converts current from photodiode 255 into an analog voltage signal, SIG $X_1$. Preferably, first sensor 120 and second sensor 130 each include a photodetector circuit 250 and each circuit outputs an analog voltage signal.

Figure 2C:
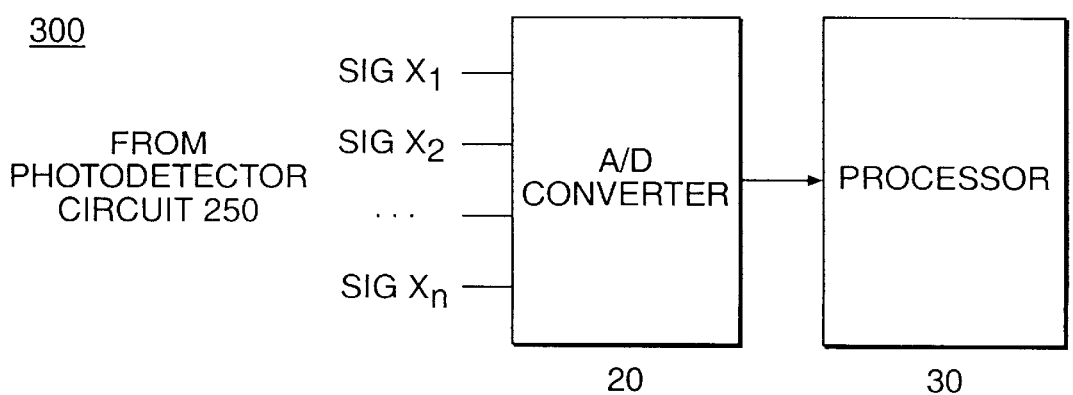
FIG. 2C is a block diagram of a processing circuit consistent with the present invention.

FIG. 2C is a schematic diagram of a processing circuit 300 consistent with the present invention. Processing circuit 300 includes an analog-to-digital (A/D) converter 20 coupled to a processor 30. In operation, A/D converter 20 is connected to the output of photodetector circuit 250 and A/D converter 20 converts the analog voltage signal SIG $X_1$ received from transimpedance amplifier circuit to a digital voltage signal. This digital signal is then sampled to produce a waveform signal that represents the light signal received at first sensor 120 or second sensor 130.

In this embodiment, the representative waveform from first sensor 120 corresponds to reflective light signal 125 and the representative waveform from second sensor 130 corresponds to transmissive light signal 135. The output of A/D converter 20 is coupled to processor 30, a standard processing device with the appropriate peripheral components. FIG. 2C shows input signals SIG. $X_1$–SIG. $X_n$, where n is the number of photodetector circuits 250 used by the apparatus.

Figure 3:
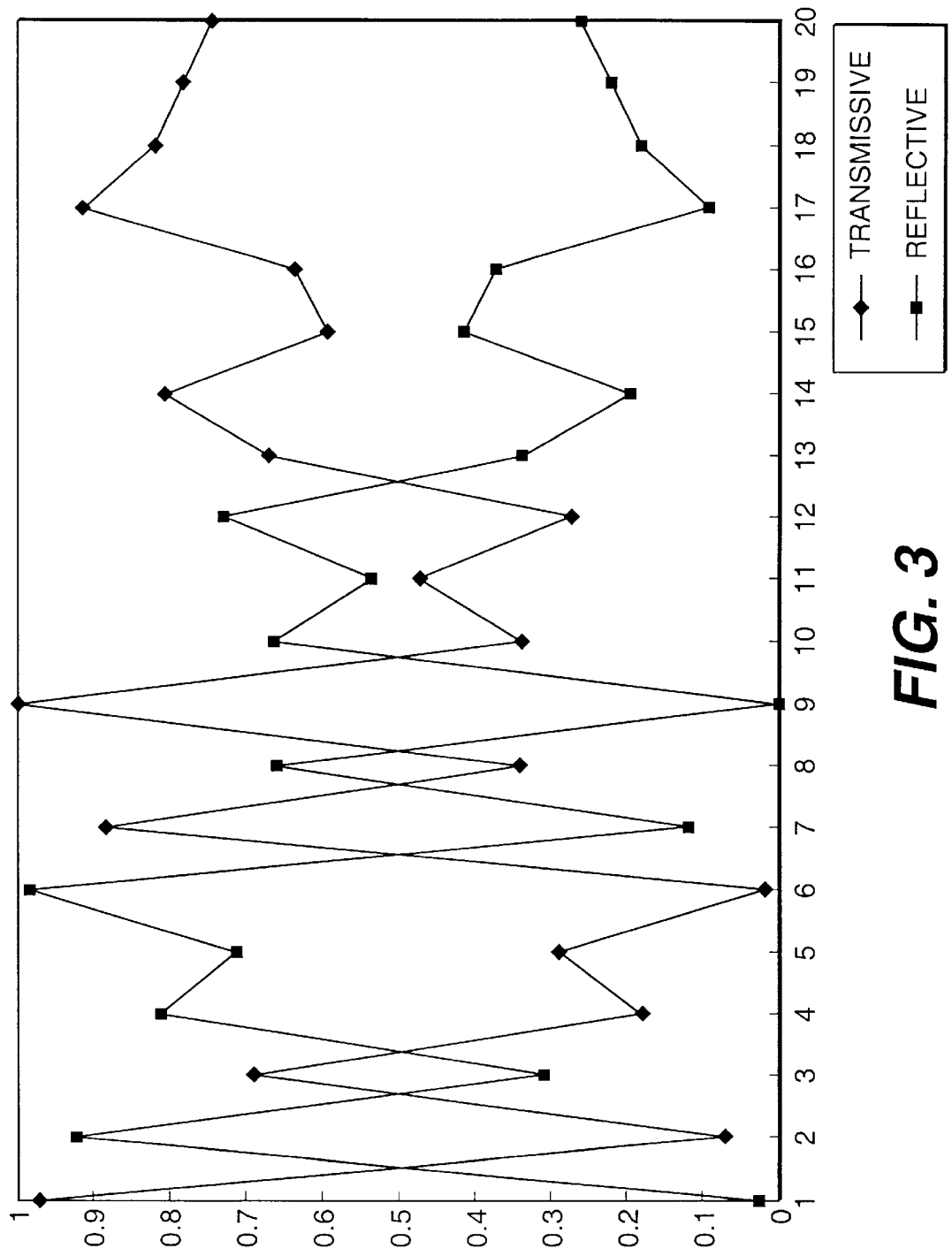
FIG. 3 is a waveform illustrating the optical signal characteristics of a real watermark.

FIG. 3 shows that the reflective and transmissive signals are identical in form, but opposite in polarity. Upon receiving the waveform signals processor 30 normalizes both signals to create identically scaled waveforms, thereby eliminating the differences caused by the miscellaneous signal inflections that are caused by the surface variations such as fading, wrinkles, etc. of individual notes. Next, processor 30 inverts one of the waveform signals and determines a difference signal between the transmissive and reflective waveforms by subtracting the two signals. Preferably, processor 30 includes or is coupled to a memory device for storing a number of predetermined difference limits to compare against the difference signal. These difference limits are based on a number of sample signals received from watermarks of genuine currency notes and are stored prior to testing. When a note under test is below a particular predetermined limit it is considered genuine. Notes exceeding the limit are rejected as fraudulent or counterfeit.

Figure 4:
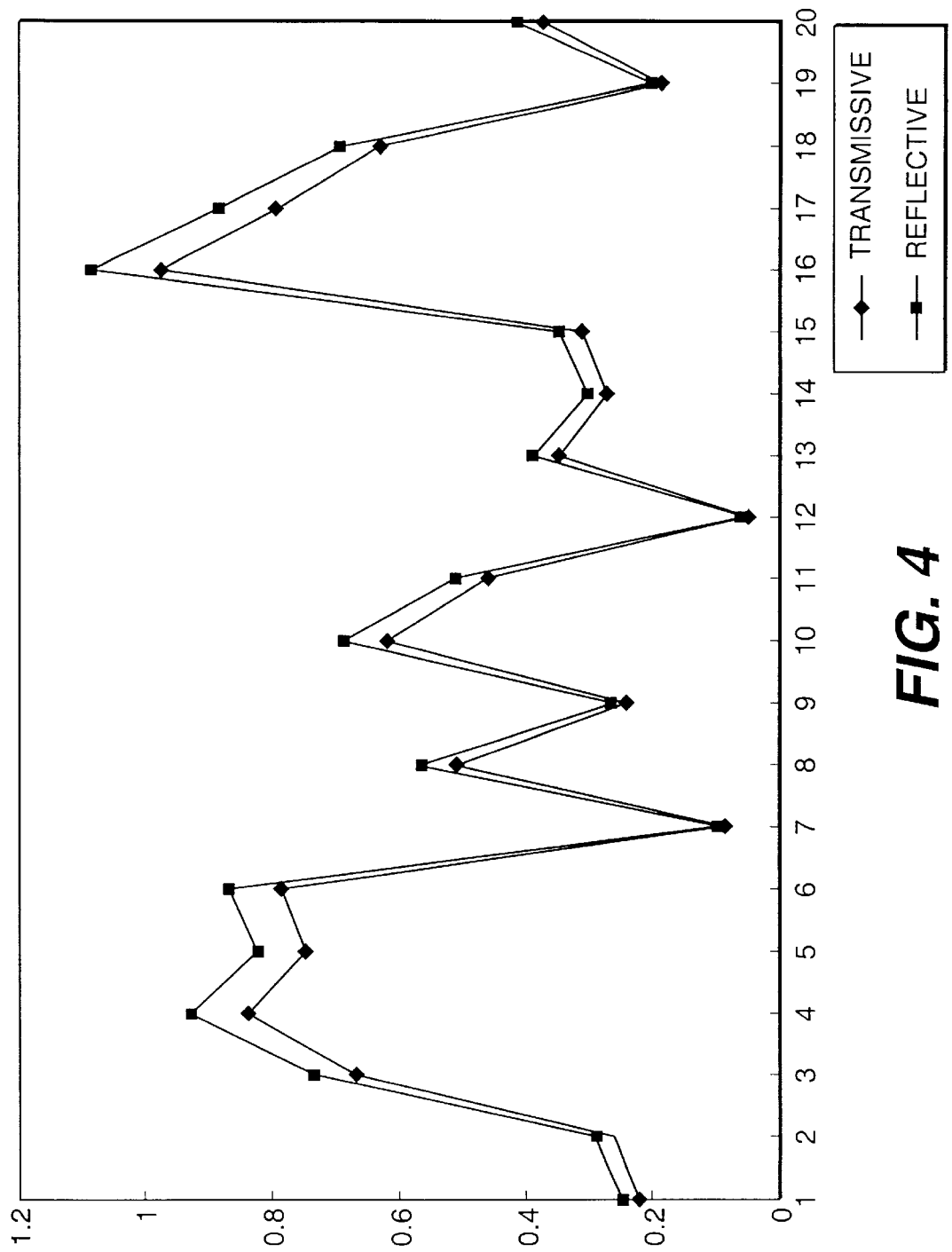
FIG. 4 is a waveform illustrating the optical signal characteristics of a counterfeit watermark.

FIG. 4 is a waveform illustrating the optical signal characteristics of a counterfeit watermark. As shown, the transmissive and reflective waveform are nearly identical in value and are the same polarity. As explained above, watermarks viewed transmissively and reflectively should exhibit opposite amplitude characteristics as shown in FIG. 3.

The technique for detecting the thread security feature is essentially identical to the data collection and observation phase of the watermark detection. The primary difference is that the thread is usually located in a narrow space and is typically a single strip in the note. The device would preferably use multiple sets (at least two) of the hardware described above to defeat striping or splitting.

Striping is a counterfeiting method of constructing a counterfeit, with strips of a real note in the body of the counterfeit. These strips are positioned to coincide with the sensors in the validator the counterfeiter is attempting to bypass. This enables a counterfeiter to take one real note and splice it to construct two or more counterfeits. To defeat the striping, sufficient sensors must be placed to cover more than 50% of the note's area, which requires multiple or wide angle sensors.

Splitting is a method of constructing a counterfeit, whereby the counterfeiter splits a note in half either laterally or longitudinally or from opposite corners to produce a 50% genuine and 50% copy. Depending on the placement of sensors in a validator, splitting enables the counterfeiter to get a 2-for-1 return on notes, when the validator accepts the split bills.

To defeat splitting, security sensors must be positioned to detect the fraudulent portion of the note. This type of detection is difficult with conventional validators, because it requires offsetting the security sensors from the center of the note channel, a more costly solution than centering the sensors.

As in the watermark embodiment, the use of light sources operating in the infrared (non visible) regions are able to detect the thread even when obscured by printing.

Figure 5:
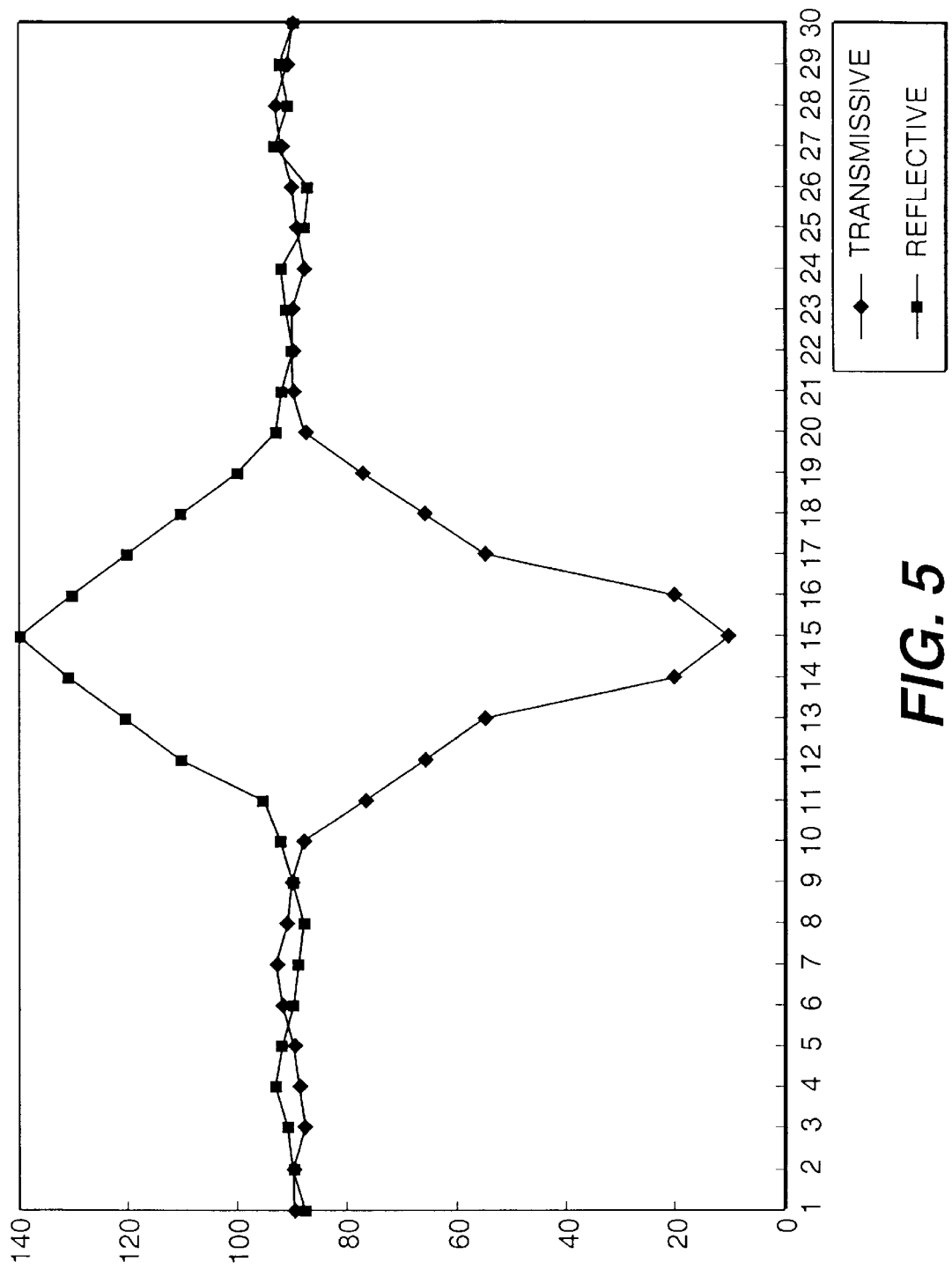
FIG. 5 is a waveform illustrating the optical signal characteristics of a security thread.

FIG. 5. shows the waveforms produced when a genuine thread is passed through the apparatus described above. The sensor receiving the transmissive signal shows a sharp drop in the amount of light detected when the thread blocks most of the light produced by illuminator 110. Preferably, the width of the illuminator's 110 light spot is adjusted to be smaller than the narrowest thread available. FIG. 5 also shows the reflective characteristics produced by either a plastic or metallized thread embedded or woven within the currency note. Since the paper is semitransparent it reflects less light in the area where the thread is absent and acts as a reflector when it is located beneath the papers surface. This effect occurs when the thread is either a light color plastic or a shiny reflective thread.

Figure 6:
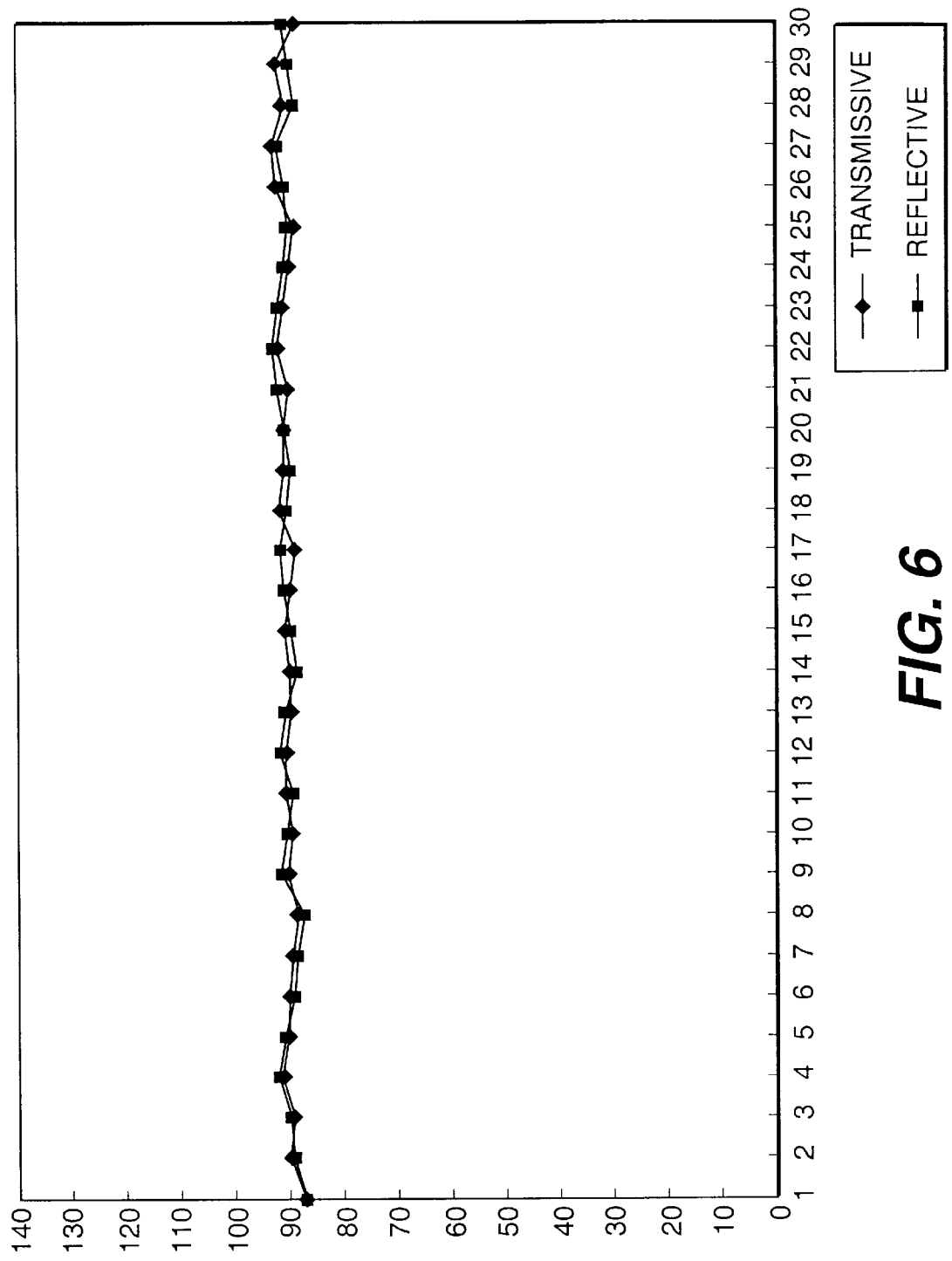
FIG. 6 is a waveform illustrating the optical signal characteristics when no thread is present.
Figure 7:
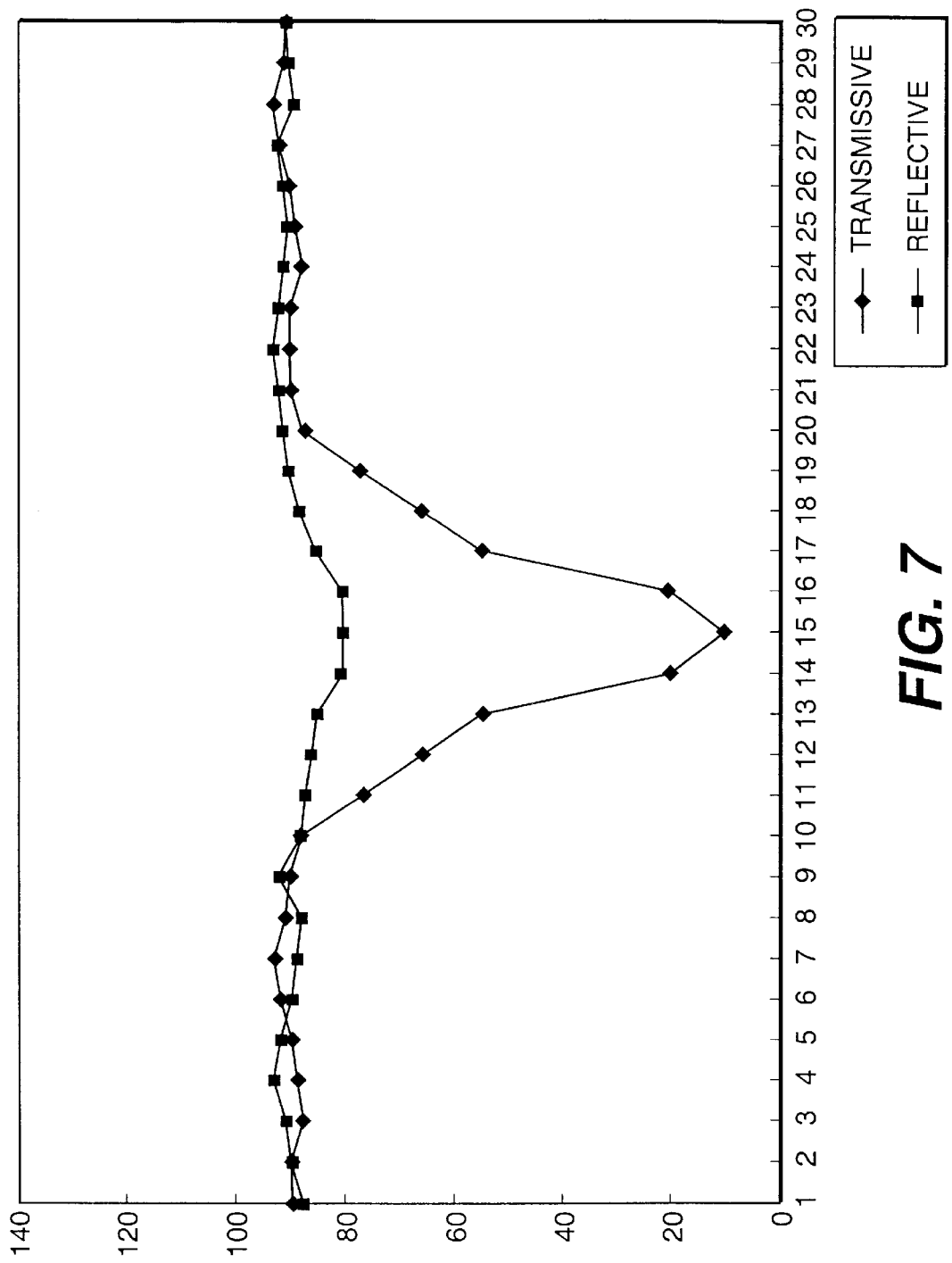
FIG. 7 is a waveform illustrating the optical signal characteristics of a counterfeit or printed security thread.

FIG. 6. shows a typical transmissive and reflective waveform when a counterfeiter produces a bill without a thread. In this case, the transmissive and reflective waveforms are nearly identical and show very little amplitude response. FIG. 7 shows a typical transmissive and reflective waveform response when a security thread is printed on one or more surfaces of the note. As shown, the transmissive and reflective waveforms are similar, though their amplitudes are different. The key detail being the dip of the reflective and transmissive data at the same point, thereby indicating that the thread is either printed or is a dark band placed across the note.

Figure 8:
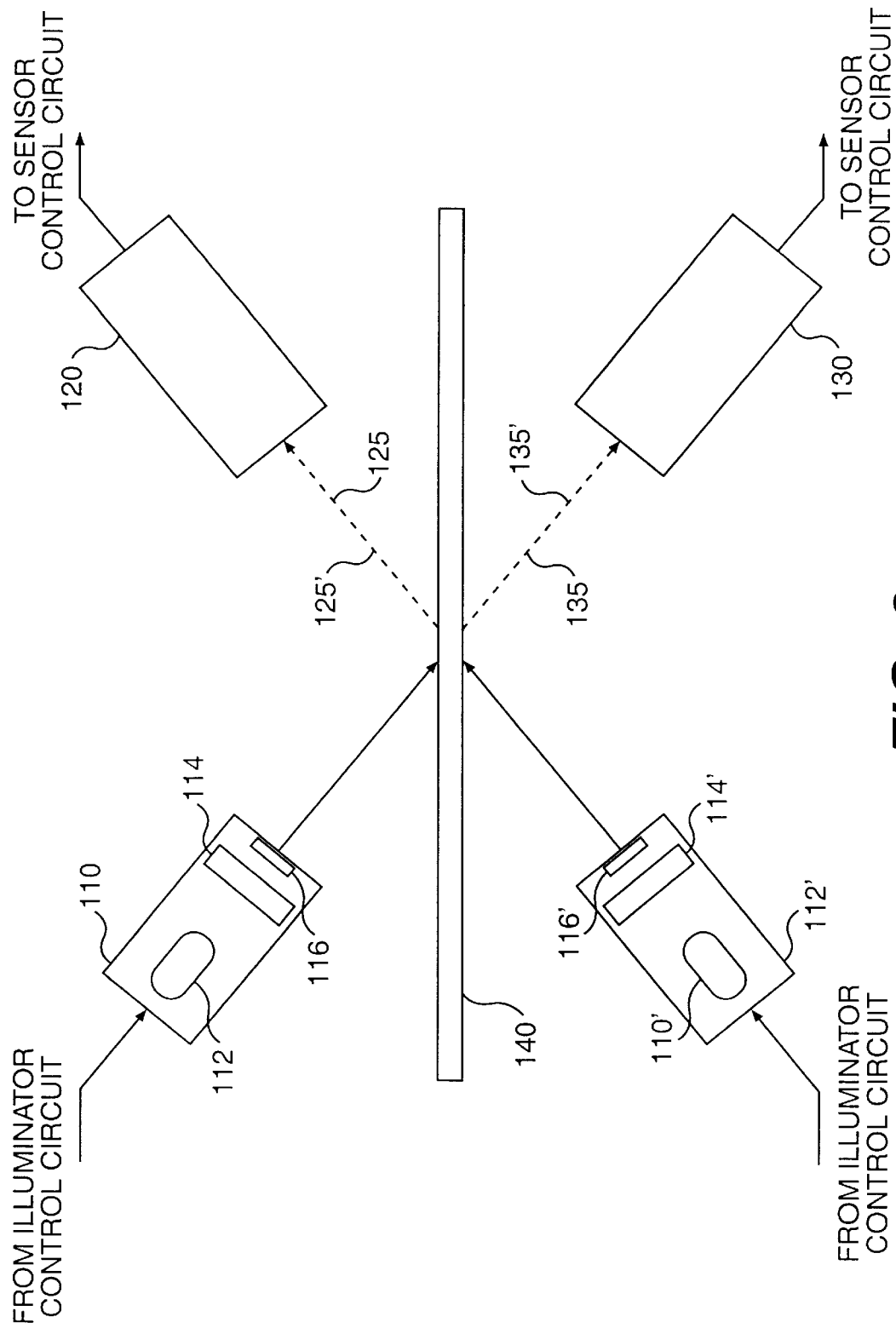
FIG. 8 is a block diagram of an apparatus for detecting a security feature in a currency note consistent with a second embodiment of the present invention.

FIG. 8 shows a second embodiment of the present invention. In this embodiment, a second illuminator 110' included to illuminate a second surface of currency note 140. Second illuminator 110' includes a laser diode as its light source 112', an aperture 114', and a focusing lens 116'. The operation of the apparatus in this embodiment is identical to the first embodiment described above, however, first sensor 120 receives both reflective signal 125 and a second transmissive signal 125' passing through currency note 140. Similarly, first sensor 130 receives both the transmissive signal 135 and a second reflective signal 135' that is reflected from the second surface of currency note 140.

In this second embodiment, second illuminator 110' is activated after illuminator 110 and the signals received at first sensor 120 and second sensor 130 are processed in the same manner described above. In this embodiment, however, first transmissive signal 135 and second transmissive signal 125' are added together to obtain a total transmissive signal. In addition, first reflective signal 125 and second reflective signal 135' are added together to obtain a total reflective signal. The total signals are calculated anytime before the difference between the transmissive and reflective waveform signals is determined. Further, the second embodiment includes a second set of circuitry as described in conjunction with FIGS. 2A and 2B. With this additional circuitry the second embodiment can test each surface of the currency note, thereby enhancing the security feature detection capabilities of the apparatus.

Those skilled in the art will recognize that various modifications and variations can be made in the preceding examples without departing from the scope or spirit of the invention. The specification does not limit the invention. Instead it provides examples and explanations to allow persons of ordinary skill to appreciate different ways to practice this invention. For example, while the apparatus shows detectors positions on opposite sides of the currency note, it is apparent that the apparatus could test different areas of the same surface of a currency note if more than one watermark or thread were position on the note. The following claims define the true scope and spirit of the invention.

What is claimed is:

1. A method for detecting a security feature in a currency note comprising:
    illuminating an area of the currency note with a light source;
    receiving a reflected light signal at a first sensor;
    receiving a transmissive light signal at a second sensor;
    converting the reflected and transmissive light signals into digital waveforms; and
    comparing the reflected light signal waveform with the transmissive light signal waveform to detect the presence or absence of a security feature.

2. The method of claim 1, wherein the first sensor is angularly positioned on a side of the currency note, and wherein the step of receiving the reflected light signal includes the substep of
    receiving the reflective light signal from a surface of the currency note.

3. The method of claim 1, wherein the second sensor is angularly positioned on an opposite side of the currency note, and wherein the step of receiving the transmissive light signal includes the substep of
    receiving the transmissive light signal passing through the currency note.

4. The method of claim 1, wherein the light source is angularly positioned on a side from the currency note.

5. The method of claim 1, the light source including at least one light emitting diode (LED), and the step of illuminating including the substep of
    projecting, from the at least one LED, an infrared light beam onto an area of the currency note containing the security feature.

6. The method of claim 5, the at least one LED emits visible light.

7. The method of claim 1, wherein the light source includes at least one laser diode and the step of illuminating includes the substep of:
    projecting from the at least one light emitting diode a laser light beam onto an area of the currency note containing the security feature.

8. The method of claim 5, the substep of projecting further includes the substeps of:
    receiving the infrared light beam at an aperture;
    adjusting the aperture to produce a narrow beam of infrared light; and
    focusing the narrow beam of infrared light with a focusing lens on the area containing the security feature.

9. The method of claim 8, wherein the first sensor includes a photodetector optically coupled to the light source having an output that is connected to an analog to digital (A/D) converter, and wherein the step of receiving, at the first sensor, includes the substeps of:
    receiving the reflected light signal at the photodetector;
    converting a signal output from the photodetector to a digital signal; and
    sampling the digital signal to produce a reflective waveform signal.

10. The method of claim 9, wherein the second sensor includes a photodetector optically coupled to the light source having an output that is connected to the A/D converter, and wherein the step of receiving, at the second sensor, includes the substeps of:
    receiving the reflected light signal at the photodetector;
    converting a signal output from the photodetector to a digital signal; and
    sampling the digital signal to produce a transmissive waveform signal.

11. The method of 10, wherein a polarity of the transmissive waveform signal is opposite a polarity of the reflective waveform signal and the step of comparing includes the substeps of:
    normalizing the reflective waveform signal and transmissive waveform signal to create two identically scaled waveforms;
    inverting the polarity of the scaled transmissive waveform signal; and subtracting the inverted and scaled transmissive waveform signal from the scaled reflective waveform signal to obtain a difference signal; and outputting the difference signal.

12. The method of claim 11, wherein the A/D converter is coupled to a processor that includes a plurality of stored difference limits, wherein each difference limit in the plurality of difference limits corresponds to a particular security feature, and wherein the method further includes the steps of:

comparing the difference signal to a difference limit in the plurality of difference limits;

accepting the currency note if the difference signal is below the difference limit for the particular security feature; and rejecting the currency note if the difference signal is above the difference limit for the particular security feature.

13. The method of 12, wherein the particular security feature is a watermark.

14. The method of claim 12, wherein the particular security feature is a security thread embedded within the currency note.

15. A method for detecting a security feature in a currency note comprising:

illuminating a first area of the currency note with a first light source positioned on one side of the currency note;

receiving, at a first sensor, a first reflected light signal positioned on the one side of the currency note;

receiving, at a second sensor, a first transmissive light signal positioned on an opposite side of the currency note;

illuminating a second area of the currency note with a second light source;

receiving a second transmissive light signal at the first sensor;

receiving a second reflective light signal at the second sensor;

converting the total transmissive light signal and the total reflective light signal into digital waveforms; and comparing a total reflective signal waveform with a total transmissive signal waveform to produce a difference signal.

16. The method of claim 15, wherein the first sensor is angularly positioned on a side of the currency note, and wherein the step of receiving the first reflected light signal includes the substep of receiving the first reflective light signal from the first area of the currency note.

17. The method of claim 16, wherein the second sensor is angularly positioned on an opposite side of the currency note, and wherein the step of receiving the first transmissive light signal includes the substep of receiving the first transmissive light signal passing through the first area of the currency note.

18. The method of claim 15, wherein the second area is on the opposite side of the currency note from the first area, wherein the step of receiving the second reflected light signal includes the substep of:

receiving the second reflective light signal from the second area of the currency note.

19. The method of claim 18, and wherein the step of receiving the second transmissive light signal includes the substep of.

receiving the second transmissive light signal passing through the second area of currency note.

20. The method of claim 15, wherein first light source is angularly positioned on one side of the currency note and wherein the second light source is angularly positioned on the opposite side of the currency note.

21. The method of claim 15, wherein the first light source includes at least one light emitting diode, and wherein the step of illuminating the first area includes the substep of:

projecting, from the at least one light emitting diode, an infrared light beam onto the first area.

22. The method of claim 21, the at least one LED emits visible light.

23. The method of claim 15, wherein at least one of the light sources includes at least one laser diode and the step of illuminating includes the substep of:

projecting from the at least one light emitting diode a laser light beam onto an area of the currency note containing the security feature.

24. The method of claim 21, wherein the substep of projecting includes the additional substeps of:

receiving the infrared light beam at an aperture;

adjusting the aperture to produce a narrow beam of infrared light; and focusing the narrow beam of infrared light, with a focusing lens, on the first area, wherein the first area contains the security feature.

25. The method of claim 21, wherein the second light source includes at least one light emitting diode, and wherein the step of illuminating includes the substep of:

projecting, from the at least one light emitting diode, an infrared light beam onto the second area.

26. The method of claim 25, wherein the substep of projecting includes the additional substeps of:

receiving the infrared light beam at the aperture;

adjusting the aperture to produce a narrow beam of infrared light; and focusing the narrow beam of infrared light, with a focusing lens, on the second area, wherein the second area contains the security feature.

27. The method of claim 21, wherein the first sensor includes a photodetector optically coupled to the first light source and the second light source, wherein the step of receiving the first reflective light signal includes the substeps of:

receiving the first reflective light signal at the photodetector; and converting the first reflective light signal to a first reflective signal.

28. The method of claim 27, wherein the substep of receiving the second reflective light signal includes the additional substeps of:

receiving the second reflected light signal at the photodetector; and converting the second reflective light signal to a second reflective voltage signal.

29. The method of claim 28, wherein the photodetector is connected to an analog to digital converter (A/D), the method further including the steps of:

combining the first reflective voltage signal with the second reflective voltage signal to produce the total reflective signal;

converting the total reflective signal to a reflective digital signal; and sampling the reflective digital signal to produce a total reflective waveform signal.

30. The method of claim 21, wherein the second sensor includes a photo detector optically coupled to the first light source and the second light source, and wherein the step of receiving the first transmissive light signal includes the substeps of:
   receiving the first transmissive light signal at the photodetector; and
   converting the first transmissive light signal to a first transmissive voltage signal.

31. The method of claim 30, wherein the substep of receiving the second transmissive light signal includes the additional substeps of:
   receiving the second transmissive light signal at the photodetector; and
   converting the second transmissive light signal to a second transmissive voltage signal.

32. The method of claim 31, wherein the photodetector is connected to the analog to digital (A/D) converter, and the method further including the steps of:
   combining the first transmissive voltage signal with the second transmissive voltage signal to produce a total transmissive signal;
   converting the total reflected signal to a second digital signal; and
   sampling the digital signal to produce a total reflective waveform signal.

33. The method of 32, wherein a polarity of the total transmissive waveform signal is opposite a polarity of the total reflective waveform signal, and wherein the step of comparing includes the substeps of:
   normalizing the total reflective waveform signal and total transmissive waveform signal to create two identically scaled waveforms;
   inverting the polarity of the scaled transmissive waveform signal; and
   subtracting the inverted and scaled transmissive waveform signal from the scaled reflective waveform signal to obtain a difference signal; and
   outputting the difference signal.

34. The method of claim 33, wherein the A/D converter is coupled to a processor that includes a plurality of stored difference limits, wherein each difference limit in the plurality of difference limits corresponds to a particular security feature, and wherein the method further includes the steps of:
   comparing the difference signal to a difference limit in the plurality of difference limits;
   accepting the currency note if the difference signal is below the difference limit for the currency note; and
   rejecting the currency note if the difference signal is above the difference limit for the particular security feature.

35. The method of 34, wherein the particular security feature is a watermark.

36. The method of claim 34, wherein the particular security feature is a security thread embedded within the currency note.

37. An apparatus for detecting a security feature in a currency note comprising:
   a light source for illuminating an area of the currency note;
   a first sensor, optically coupled to the light source, for receiving a reflected light signal;
   a second sensor, optically coupled to the light source, for receiving a transmissive light signal; and
   a processing circuit connected to the first and second sensors for converting the reflective light signal and the transmissive light signal into digital waveforms and comparing the reflected light signal waveform with the transmissive light signal waveform to detect the presence or absence of a security feature.

38. The apparatus of claim 37, wherein the first sensor is angularly positioned on a one side of the currency note.

39. The apparatus of claim 37, wherein the second sensor is angularly positioned on an opposite side of the currency note.

40. The apparatus of claim 37, wherein the light source is angularly positioned on from the currency note.

41. The apparatus of claim 37, wherein the light source includes a light emitting diode for projecting an infrared light beam; and
   a focusing lens for focusing the infrared light beam onto an area of the currency note, wherein the area contains the security feature.

42. The apparatus of claim 37, wherein the first sensor includes
   a photodetector optically coupled to the light source.

43. The apparatus of claim 42, wherein the photodetector is connected to the processing circuit that includes
   means for converting the received transmissive light signal to a voltage signal;
   means for converting the voltage signal to a digital signal; and
   means for sampling the digital signal to produce a transmissive waveform signal.

44. The apparatus of claim 37, wherein the second sensor includes
   a second photodetector optically coupled to the light source.

45. The apparatus of claim 44, wherein the photodetector is a phototransistor.

46. The apparatus of claim 45, wherein the photodetector is a photodiode.

47. The apparatus of claim 46, wherein the photodetector is connected to the processing circuit that includes
   means for converting the received reflective light signal to a voltage signal;
   means for converting the voltage signal to a digital signal, and
   means for sampling the digital signal to produce a reflective waveform signal.

48. The apparatus of 47, wherein a polarity of the transmissive waveform signal is opposite a polarity of the reflective waveform signal, the processing circuit further including
   means for normalizing the reflective waveform signal and transmissive waveform signal to create two identically scaled waveforms;
   means for inverting the polarity of the scaled transmissive waveform signal; and
   means for subtracting the inverted and scaled transmissive waveform signal from the scaled reflective waveform signal to obtain a difference signal; and
   means for outputting the difference signal.

49. The apparatus of claim 37, wherein the processing circuit stores a plurality of stored difference limits, wherein each difference limit in the plurality of difference limits corresponds to a security feature, and the apparatus further including means for accepting the currency note if the difference signal is below the difference limit for the security feature; and means for rejecting the currency note if the difference signal is above the difference limit for the security feature.

50. The apparatus of 49, wherein the security feature is a watermark.

51. The apparatus of claim 49, wherein the security feature is a security thread embedded within the currency note.

* * * * *

UNITED STATES PATENT AND TRADEMARK OFFICE
CERTIFICATE OF CORRECTION

PATENT NO.: 6,104,036

DATED: August 15, 2000

INVENTOR(S): Thomas W. Mazowiesky, Hauppauge, N.Y.

It is certified that an error appears in the above-identified patent and that said Letters Patent is hereby corrected as shown below:

Claim 19, col. 9, line 67, "of." should read --of:--.

Signed and Sealed this

Twenty-fourth Day of April, 2001

*Attest:*

NICHOLAS P. GODICI

*Attesting Officer*     *Acting Director of the United States Patent and Trademark Office*